8658X
J. MORRIS.
CUTTING MEAT.
Patented Feb. 25, 1835.
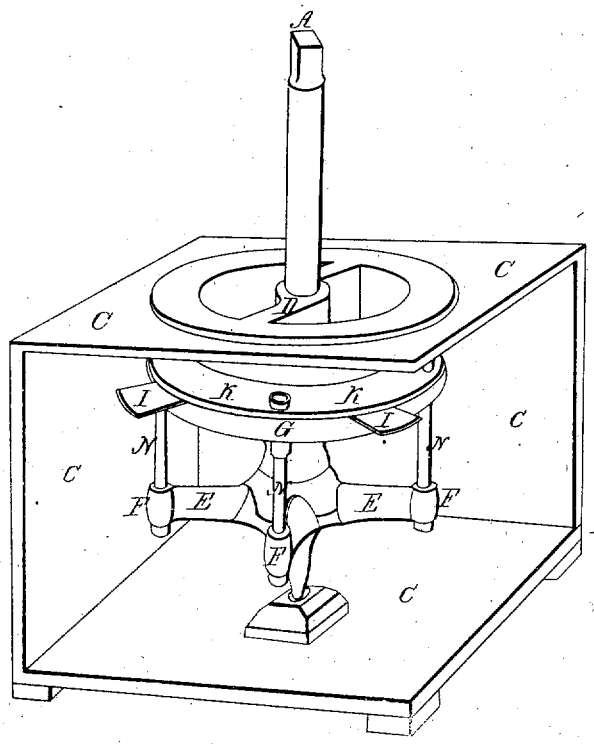
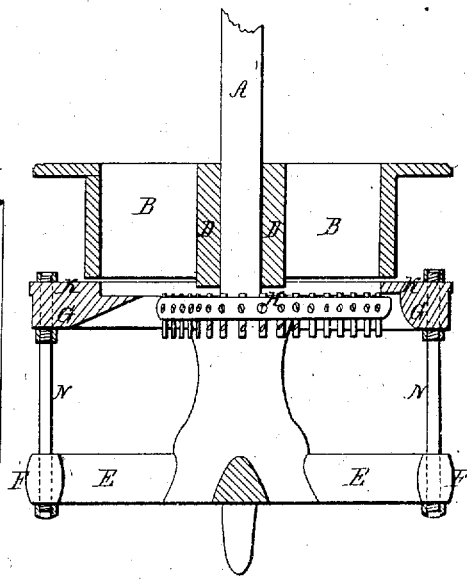
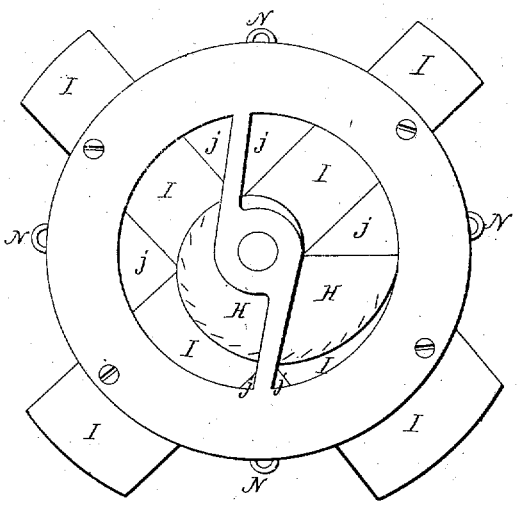

ar 12

8658X Feb. 25. 1835 269

John Morris. Derby. Connecticut.

Letters Patent.

The Schedule referred to in these Letters Patent and making part of the same containing a description in the words of the said John Morris himself of his improvement in a Machine called a horizontal & transverse cutting machine for cutting meat or flesh to be used for food and other soft substances and reducing them to parts or pieces of any required degree of fineness.

To all people to whom these presents shall come. Be it known that I, John Morris of the town of Derby, County of New Haven and State of Connecticut, have invented a new and useful Machine called a Horizontal and transverse cutting Machine for cutting meat or flesh to be used for food, and other soft substances and reducing them to parts or pieces of any required degree of fineness; and that the following is a full & exact description of the operation and construction of the said Machine as invented by me, that is to say. The machine consists of the following parts viz. a shaft, center and arms. Two beds and knives, Hopper & Gearing with their appropriate fastenings and a case. 1st The shaft is a round bolt of about one inch diameter and thirty inches long wrought to a point at the lower end, adapted to receive a crank or Gearing at the other and polished smooth. 2d Center and arms. The center is an upright Cylinder 7 inches long & 2 inches in diameter with a perpendicular hole through it of one inch to admit the shaft. From its bottom 4 arms, possessing each the strength of an inch bar & 8 inches long branch horizontally at right angles, forming when received from the under side 2 diameters of 18 inches in length severed in the middle by the hole in the center and otherwise crossing that center at right angles. These arms may be square or or round but their appearance is improved by flattening
the rod the widest part being perpendicular & lessened in
thickness & rounded on the top & tapering from the center to the
bulb or swell near the extremity. Through this swell in each
arm a perpendicular hole is made & a thread therein to admit
a screw. 3 The beds and knives...1. The outer bed for horizontal
knives is a circle of 16 inches diameter and one inch thick at
the rim, but is diminished in thickness as the cavity in the
middle is approached and on reaching it is reduced on
the under side to an edge. the shape of this cavity is such
as to fit the inner Bed for the perpendicular knives herein-
after described. Through the outer bed near its outside or
rim 4 perpendicular holes are made of 3/8 inch diameter at
the distance of 90 degrees or a quarter of the circle from each
other. Four flat broad knives or cutters of 1/8 inch in thickness,
convex on the outer end to correspond with the rim of the bed
and concave on the inner end which is the edge, and so shap-
ed as passing over the edge of the bed on the upper side about
one half inch to fit and form the surface of the inner cavity
The knives compared with each other are of unequal widths. but
each is of uniform width and exactly fitted to fill the space
between the Furs: which are flat triangular pieces of differ-
ent sizes of the same thickness as the knives and placed between
them, convex at their outer end or base to correspond with
the rim of the bed and their inner end or angle terminating
between the knives at the edge of the inner curved opening.
These knives and Furs cover the upper surface of the Bed,
and while the latter are secured immoveably to the bed by
means of screws or rivets both are further fastened by
means of a flat circular ring 1/2 inch thick 2 inches wide and
16 inches in diameter placed over them & fixed by means of
screws passed partly through a knife & fur or between them. &
into the bed. As the knives will require to be removed in
order order to be sharpened on turning the screws the Ring is loosened and they are taken out & returned again at pleasure. The 4 perpendicular holes above mentioned to be made through the bed should also be made through the Fliers. Four round bars of 3/4 inch diameter and 10 inches long with a screw cut on one end to receive a nut & on the other to fit the thread in the hole through the arms, are put on through each arm and the other end inserted through the hole in the outer Bed Fliers & Ring is secured firmly by a nut on the top; and thus the center & arms and outer bed are connected together ready to receive the shaft and inner bed. 2. The inner bed for perpendicular knives occupies the center and nearly fills the cavity in the outer bed of the Machine. It is a flat plate of the same thickness as the outer bed and its shape is that of a circle whose diameter by an uniform extension increases from 2 to 6 inches; or it is a line connecting the ends of successive and contiguous diameters drawn from the same center and increasing in length by a gradual and uniform ratio from 2 in. inches to 6 in. In the center is made a hole of one inch diameter to admit the shaft, near the outer edge of the inner bed small perpendicular mortices are made of the size of the knives to be inserted say 3/4 by 1/25 to 1/32 part of an inch, or small grooves cut perpendicularly on the edge, of the same dimentions may be used and the knives are fastened firmly in each by means of a screw passed through them and into the bed: These knives 13 in number should be 2 inches long a little crooked or notched under on the fore side and so placed as that when the Machine is in motion the edge of each will describe a true circle around the same center and each should extend above the bed ordinarily from 1/16 to 1/8 inch. This bed being formed and the knives fixed thereto is put upon the shaft and lowered down to rest on the top of the center cylinder, the shaft being firmly fastened in both by a wedge.

8658X wedge or pin or if preferred by a nut and screw on the shaft above & below. 4 The Hopper & Bearing is a hollow band or Circle 12 inches in diameter on the inside 5 inches deep & from ½ inch to one inch thick divided in the middle perpendicularly by a diameter or cross bar of the same depth and thickness and with a flange on the outside of 1½ inches, it is fastened by means of screws to and in the center of the top of the case. A cylinder is formed in the center of the cross bar 2 inches in diameter, which perforated perpendicularly to admit the shaft to pass through becomes its upper bearing. On the bottom of the case inside and in the center is placed a metallic step fixed in a block of wood on which the bottom of the shaft is to rest and which is to be raised or lowered by means of a screw underneath passing through the case. 5 The case is a square wooden box of sufficient size and height to admit & inclose the machine. The cover or lid to which the hopper is fixed must be so fastened as to admit of being removed that the machine may be taken out when necessary. A small door is also to be made near the bottom on one side of the case. by opening which the cuttings can be drawn out after the operation. In the formation of the inner bed care must be taken that it be a little less say 1/16 to 1/8 inch than the cavity formed by the edge of the horizontal knives, so that a space may be left for the cuttings to pass between and drop into the case below when the two beds are nearest to the same level. The 4 Bars connecting the arms and the outer bed may be fastened permanently in the arms & a screw formed on the upper end far enough to reach say one inch below the bed and a nut being placed on it below the bed, will serve to raise or depress it as shall be required while a nut on the top will secure it firmly down. The whole machine may be made of cast or wrought iron or composition metal

8658X metal except the knives which must be of Steel and the case which should be of wood. The number of the knives in each bed may be varied as shall be wished and the dimentions of the Machine enlarged or diminished at pleasure according to the power intended to move it. The distance between the outer and inner beds and of course the size of the opening between them may be enlarged or diminished by turning the screws on the Bars in the arms, if at the lower end or the nut below the bed, if on the upper end; the screw below the step having been first employed in case of raising to lower the Machine & in case of lowering, afterwards to raise it up to the under side of the hopper. If coarse cutting is designed this space between the beds will require to be enlarged, that is the outer bed will be raised above the other, but if fine cutting this space will be diminished by lowering the same down. The perpendicular knives will also admit of a small elevation & depression which will conspire to produce the same result.

The Machine being inserted in the box, the shaft on the step and the hopper & bearing on and fastened down & graduated to the degree of fineness required in the Cuttings, is turned rapidly round by a crank on the top of the shaft, if by hand, or by gearing attached thereto, if by water or other power; and the meat having been cleared from the bone. or other substance designed to be cut reduced to parts or pieces of convenient size & put into the Hopper is cut into shreds by the perpendicular knives and these again cut off at proper lengths by the horizontal ones, drop thro the cavity between the beds into the case below. If very fine cutting is required and one operation is not sufficient, the requisite fineness may be attained by repeating the process.

What I claim as new in this invention is, not the

Case

8658X

Case but the machine as arranged, constructed & adapted to the objects specified. Its advantages are very many and will readily occur to every intelligent mind: among them obvious are the rendering soft and tender the parts of the flesh of animals naturally hard and dificult of mastication. The preserving all the pieces entire and thereby avoiding the waste of them incident to the most common modes of preserving and preparing it for food and thus retaining un=expended the peculiar flavor of each kind: and the facility offered by this process of applying instantly at all seasons to each minute part of it the means of preservation and seasoning without incurring the danger of putrefaction consequent on the slow action of those means upon large masses in the present mode of curing them.

In witness whereof I have hereunto set my hand this nineteenth day of January anno Domini 1835.

Witnesses
Sheldon Canfield Jr
John L. Tomlinson.

John Morris.

Exd.
M.G.

X(12136 words)

(Granted February 28. 1835)

(Drawing)